United States Patent [19]

Millar et al.

[11] Patent Number: 5,453,873

[45] Date of Patent: * Sep. 26, 1995

[54] OPTICAL AMPLIFIER AND LASER

[75] Inventors: Colin A. Millar; Michael C. Brierley; Timothy J. Whitley, all of Suffolk, England

[73] Assignee: British Telecommunications public limited company, London, England

[*] Notice: The portion of the term of this patent subsequent to Nov. 29, 2011 has been disclaimed.

[21] Appl. No.: 309,136

[22] Filed: Sep. 20, 1994

Related U.S. Application Data

[63] Continuation of Ser. No. 59,412, May 11, 1993, Pat. No. 5,369,523, which is a continuation of Ser. No. 822,287, Jan. 17, 1992, abandoned.

[30] Foreign Application Priority Data

Jul. 9, 1991 [GB] United Kingdom ............. 9114730

[51] Int. Cl.$^6$ .............................. H01S 3/30; G02B 6/26
[52] U.S. Cl. .......................... 359/341; 359/343; 359/345; 372/40; 372/70
[58] Field of Search ................. 359/341–343, 359/345; 372/39, 40, 68, 70

[56] References Cited

U.S. PATENT DOCUMENTS 4,935,722  6/1990  Pollack ..................... 340/479
4,962,995  10/1990  Andrews et al. ............. 372/40
5,008,890  4/1991  McFarlane .................. 372/70
5,050,949  9/1991  DiGiovenni et al. .......... 359/341
5,084,880  1/1992  Miller et al. ............... 372/40
5,369,523  11/1994  Millar et al. ............... 359/341

OTHER PUBLICATIONS

Goh, S. C., The Int. Symp. a Halide Glasses, Australia, Mar. 21, 1991, 5 pgs.

Davey et al., Br. Telecom. Technol., vol. 7, #1, Jan. 1989, p. 584.

Smart et al., Proc. SPIE, Int. Soc. Opt. Eng., vol. 1373, pp. 158–165, Sep. 19, 1990.

Freace et al., Proc. SPIE, Int. Soc. Opt. Eng., Sep. 8, 1989, vol. 1171, pp. 65–71.

*Primary Examiner*—Nelson Moskowitz
*Attorney, Agent, or Firm*—Nixon & Vanderhye

[57] ABSTRACT

A laser has a resonant cavity defined by a pair of mirrors (6, 10) butted to respective ends of a 3 m fluorozirconate optical fibre (14). The fibre (14) has a $\Delta n$ of 0.014 and a cut-off wavelength of around 790 nm and is doped to about 500 ppm (weight) with erbium ions. An optical pump source (12) provides a pump signal at 971 nm which excites the erbium ions into the $^4S_{3/2}$ energy level to provide lasing at about 546 nm. The laser may alternatively be pumped by a pump signal in the band 791 nm to 812 nm, preferably 801 nm. The pump source is preferably a high power semiconductor laser (16).

12 Claims, 3 Drawing Sheets

OPTICAL AMPLIFIER AND LASER

This is a continuation of application Ser. No. 08/059,412, filed May 11, 1993, now U.S. Pat. No. 5,369,523 which is a Cont. of Ser. No. 07/822,287 filed Jan. 17, 1992, now abandoned.

BACKGROUND AND SUMMARY OF THE INVENTION

The impact that an efficient, inexpensive and reliable visible laser source would have on data storage, display technology, undersea communications and optical processing has provided the stimulus for much recent work on solid state visible lasers. One approach that has yielded much success is the use of upconversion processes within rare earth doped materials to produce laser emission at a wavelength significantly shorter than the pump wavelength. Applied to bulk crystals, lasing has been demonstrated at 380 nm in Nd: $LaF_7$ and 551 nm and 671 nm in Er: $YLiF_4$. (See MACFARLANE, R. M., TONG F., SILVERSMITH, A. J., AND LENTH, W.: 'Violet cw neodymium upconversion laser', Appl. Phys. Lett., 1988, 52, (16), pp. 1300–1302, and MACFARLANE, R. M.: 'Dual wavelength visible upconversion laser', Appl Phys. Lett., 1989, 54, (23), pp. 2301–2302, respectively). Unfortunately all of these schemes require liquid nitrogen cooling. However, the recent demonstration of visible lasing at 480 nm in $Tm^{3+}$-doped fluoride fibre (see ALLAIN, J. Y., MONERIE, M. AND POIGNANT, H.: 'Blue upconversion fluorozirconate fibre laser', Electron. Lett., 1990, 26 (3), pp. 166–168) coupled with the demonstration of room temperature lasing at red, green and blue wavelengths in praseodymium doped fluorozirconate glass fibre (see SMART, R. G., HANNA, D. C., TROPPER, A. C., DAVEY, S. T., CARTER, S. F., SZEBESTA, D.,: 'CW upconversion lasing at blue, green and red wavelengths in an infrared-pumped $Pr^{3+}$-doped fluoride fibre at room temperature', PD paper, CLEO 91, Baltimore, Md., USA (also published in Electron. Lett., 1991, 27, (14), pp 1307–1309) has dramatically changed the viability of such upconversion pumped laser schemes.

The applicants have determined that significant gain at 850 nm can be achieved when erbium doped fluorozirconate fibre is pumped at 800 nm. The 850 nm emission they observed originated from the $^4S_{3/2}$ level, and required the sequential absorption of 800 nm pump photons. The present invention is based on the observation by the applicants that there is also green fluorescence which is ascribed to a transition between the $^4S_{3/2}$ level and the $^4I_{15/2}$ ground state of the system (FIG. 1). In bulk crystals doped with erbium (Er: $YLiF_4$) this is a well known transition and has resulted in upconversion lasing at 551 nm when cooled to 77K. (See McFarlane ibid—Appl. Phys. Lett 54 (23))

In such bulk crystal lasers, ions are excited into the upper laser level predominantly through an ion-ion interaction between ions residing in the $^4I_{11/2}$ manifold. However, in lightly doped fluorozirconate fibre, ion-ion interactions are negligible, and the dominant excitation mechanism is attributed by the applicant to excited state absorption (ESA) of pump photons.

FIG. 1 represents the energy levels of the trivalent erbium ion, with the relevant green lasing transition indicated between the $^4S_{3/2}$ level and the $^4I_{15/2}$ groundstate The upper laser level may be populated by the sequential absorption of 801 nm pump photons in a process which involves excitation of ground state ions into the $^4I_{9/2}$ band, some of which then branch into the $^4I_{11/2}$ and the $^4I_{13/2}$ levels. These ions are then further excited by pump photons into the $^4F_{3/2}$ and $^2H_{11/2}$ and other levels A large proportion of the ions . in these higher energy levels then relax into the $^4S_{3/2}$ upper laser level, from which a direct transition to the ground state is responsible for the green emission.

According to a first aspect of the present invention an optical amplifier comprises: a fluorozirconate waveguide doped with erbium ions; and an optical pump means coupled to said waveguide for providing an optical pump signal capable of exciting said erbium ions into the $^4S_{3/2}$ energy level; whereby the amplifier can provide optical gain at about 546 nm.

The waveguide may conveniently comprise a fluorozirconate optical fibre waveguide but other types of waveguide may be employed. For example, it is expected that a useful configuration would be a planar waveguide structure formed by doping a fluorozirconate glass substrate. High dopant concentration would lead to compact (short waveguide length) devices.

The invention has been demonstrated in standard ZBLAN fluorozirconate waveguides; the proportions of the glass components is not expected to be critical.

The pump may be coupled to the fibre by any known appropriate technique. The high numerical apperture fluorozirconate fibre may be spliced to a silica fibre so that readily available fused couplers, for example, can be used to couple pump and signal sources to the doped fibre.

The $^4S_{3/2}$ energy level of the erbium ions can be excited by pump wavelengths in the range 791 nm to 812 nm, preferably 801 nm.

According to a second aspect of the present invention, a laser comprises: a fluorozirconate waveguide doped with erbium ions; an optical pump means coupled to said waveguide for providing an optical pump signal capable of exciting said erbium ions into the $^4S_{3/2}$ energy level; and a pair of reflectors, one at each end of the waveguide, which reflectors define a resonant cavity, the reflectors having reflectivities to provide lasing action at about 546 nm when the fibre is pumped by the pumping means.

The reflectors, which may be mirrors or other reflectors such as Sagnac loop reflectors, define a Fabry-Perot cavity and in known manner are selected to provide reflections sufficient to sustain lasing only at the desired wavelength.

When pumped at 801 nm the green emission suffers from competition with the 4-level 850 nm transition. The applicants have determined that for lasing to occur on this $^4S_{3/2}$–$^4I_{13/2}$ transition it is necessary to pump ions out of the, long lived, $^4I_{13/2}$ terminal state. In the 801 nm pumped scheme this condition is met through the strong pump ESA out of $^4I_{13/2}$ state.

It has been found preferable to use a pump wavelength of about 971 nm. In this 971 nm pumping scheme a population is allowed to build up in the $^4I_{13/2}$ level and thus reduce the likelihood of transitions at 850 nm.

The dopant concentrations useful with the present invention is governed by certain general criteria applicable to doped waveguide amplifiers. For low dopant levels of about 0.01 wt % the length of the doped waveguide must be long enough to provide the required gain, but this competes with the fibre background loss of about 0.2 dB/m which effectively diminishes the amplifier or laser performance. To optimise the length-density product, values of concentration of 0.1 wt % are typically chosen. At a concentration of about 1 wt % various ion-ion interactions occur which degrade the amplifier or laser performance. At concentrations in excess of about 4 wt % the glass becomes unstable and unusable. These considerations are well known and the level of dopant required in a given application can be readily determined.

On the basis of the above criteria waveguide lengths will generally be in the range 0.1 to 10 m with lengths in the range 1 to 5 m being prefered.

BRIEF DESCRIPTION OF THE DRAWINGS

The invention will now be described, by way of example only, with reference to the accompanying drawings of which.

DETAILED DESCRIPTION OF THE DRAWINGS

Figure 1:
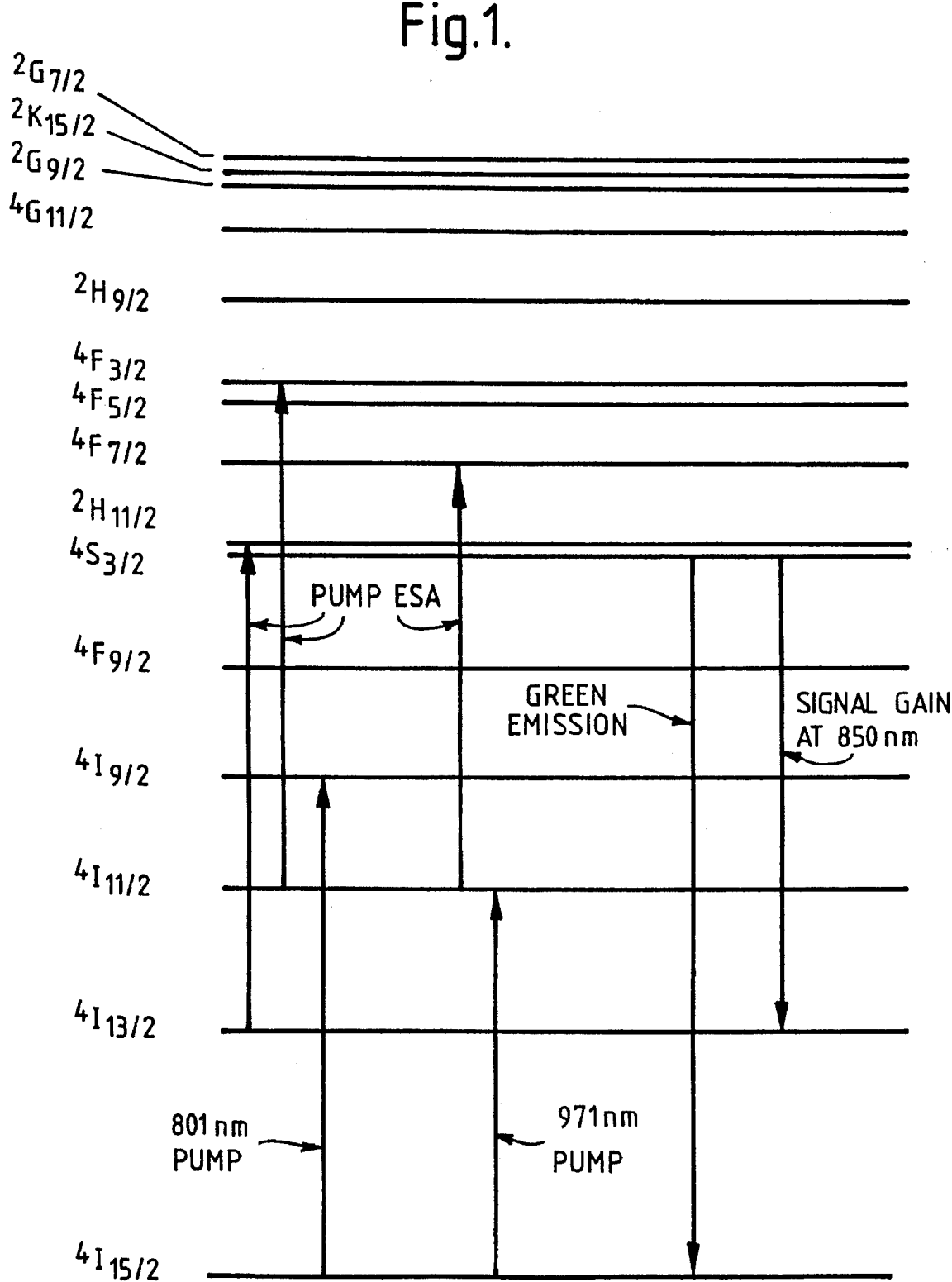
FIG. 1 is a diagram showing the energy levels of a trivalent erbium ion in a fluorozirconate host.

Referring to FIG. 1, lasing at a wavelength of 546 nm is achieved by establishing a population inversion between the $^4S_{3/2}$ upper level and the $^4I_{15/2}$ ground state. Two alternative pump excitation schemes can be employed to achieve this inversion. In the first, pump light at a wavelength of about 801 nm is used to excite ions into the $^4I_{9/2}$ level a proportion of which then branch into the long lived $^4I_{11/2}$ and $^4I_{13/2}$ states. These ions then undergo further excitation through the sequential absorption of pump photons. This process of pump excited state absorption (ESA) excites ions into the $^2H_{11/2}$ and $^4F_{3/2}$ states from where they decay non-radiatively into the $^4S_{3/2}$ upper laser level.

In the second excitation scheme pump light at a wavelength of about 971 nm is used to excite ions into the $^4I_{11/2}$ state from which ESA of pump photons promotes ions into the $^4F_{7/2}$ state. Non-radiative decay from this level then establishes a population in the $^4S_{3/2}$ upper laser level from which green lasing can once again occur to the ground state.

Figure 2:
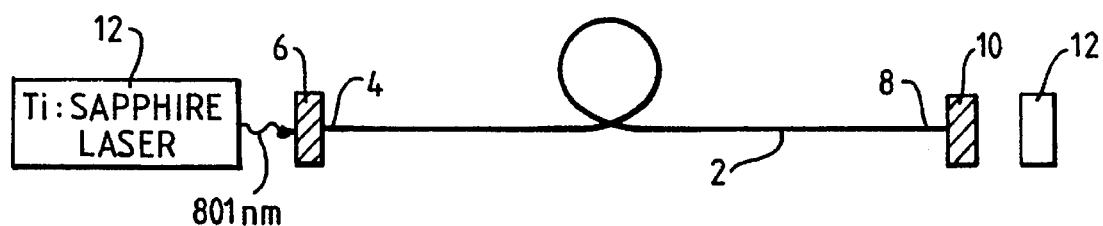
FIGS. 2 and 3 are schematic diagrams of two embodiments of lasers according to the present invention.
Figure 5:
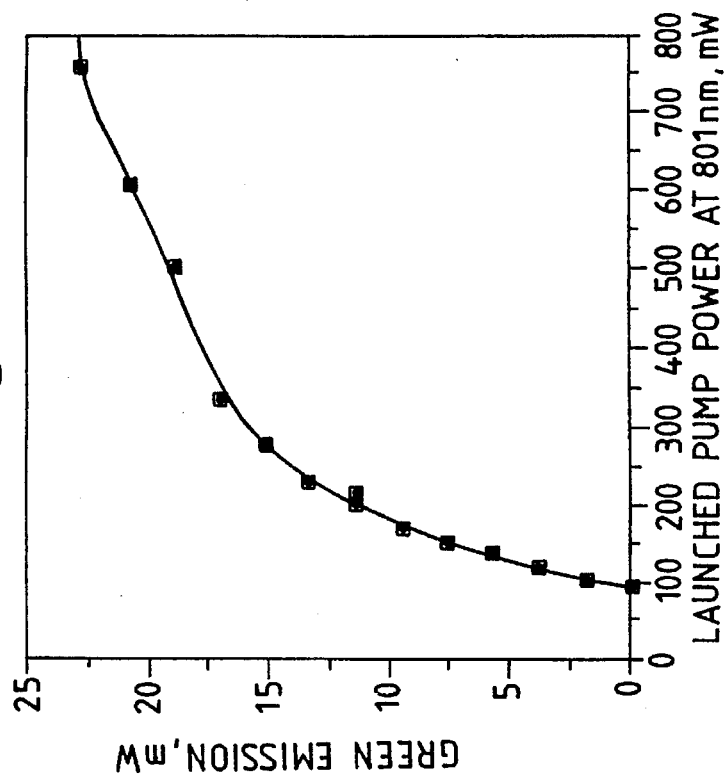

Referring now to FIG. 2, a laser according to the present invention is based on a 2.4 m length of standard formulation ZBLAN fluorozirconate fibre 2 doped to about 500 ppmw with erbium ions. The fibre An was 0.007 and LP11 mode cut-off was 790 nm. The fibre background loss at both pump and signal wavelengths is estimated to be around 1.2 dB/m. A simple Fabry-Perot laser cavity was formed by butting an input end 4 of the fibre 2 against a dielectric mirror 6 highly reflecting at 546 nm and highly transmitting at 800 nm/850 nm, and butting an output end 8 of the fibre 2 against a mirror 8 which is 65% reflecting to green light and highly transmitting at 800 nm/850 nm. 801 nm pump light, was derived from an Ar$^+$ pumped Ti: Sapphire laser 12 which was end-fire launched through the input mirror 6. A pump blocking filter 12 was used to separate the remnant pump and green emission after transmission through the output mirror 8. FIG. 5 depicts the evolution of output power at a wavelength of around 546 nm with the absorbed pump power at a wavelength of 801 nm. The threshold for lasing is around 100 mW absorbed pump power, which corresponds to a launched pump power of 160 mW. The maximum output power achieved was 23 mW for an absorbed pump power of 780 mW. Two definite slopes are apparent from this lasing characteristic. Taking the gradient of the initial part of this graph, a slope efficiency against absorbed pump power of 11% is obtained. The saturation behaviour beyond pump powers of 250 mW is thought to associated with the competing laser transition at 850 nm. In general it was found that the linear region below 250 mW corresponded to green lasing alone whereas the reduced slope beyond 250 mW corresponded to simultaneous lasing at both 850 nm and 546 nm.

Figure 4:
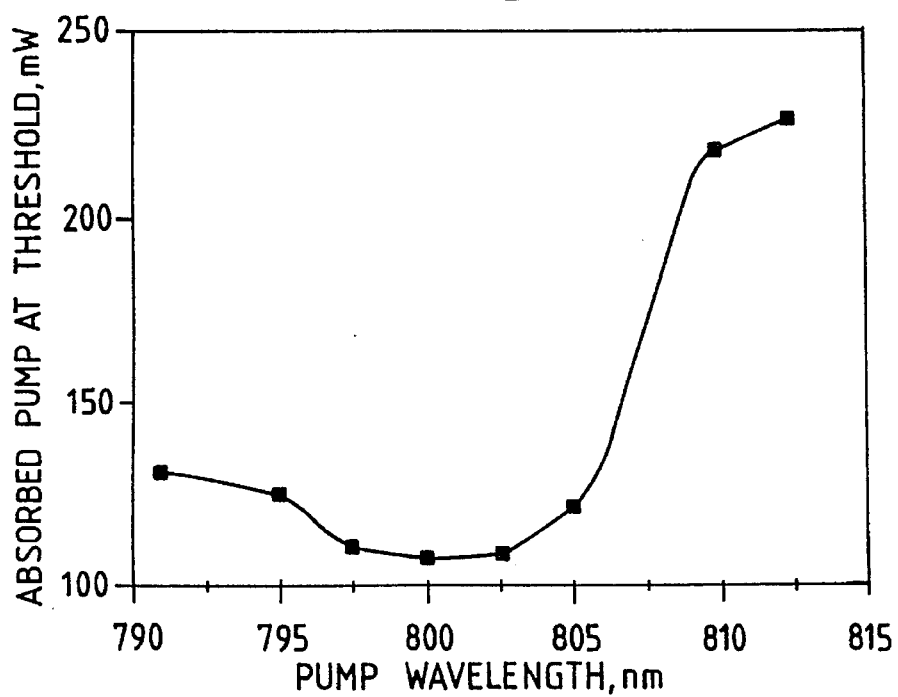
FIG. 4 is a graph of the absorbed pump power at threshold as a function pump wavelength for the laser of FIG. 2.

To assess the sensitivity to pump wavelength, the pump power absorbed at threshold was measured for different pump wavelengths. These results are shown in FIG. 4. Lasing action in the green could be sustained using pump wavelengths ranging from 791 to 812 nm, though most efficient operation was achieved using a pump wavelength of 801 nm. The relative insensitivity to pump wavelength, less than 20% change in lasing threshold for ±5 nm change in pump wavelength, means that standard Fabry-Perot laser diodes could be used as a pump source. It should also be noted that the lasing threshold rises more rapidly when the pump wavelength is moved to longer wavelengths. This asymmetry could possible be explained by the presence of an ESA at 550 nm between the $^4I_{13/2}$ and $^2H_{9/2}$ levels In tuning the pump wavelength, the relative rate at which ions are pumped out of the $^4I_{13/2}$ and $^4I_{11/2}$ levels is changed, ESA from the $^4I_{13/2}$ level being centred at 790 nm and ESA from the $^4I_{11/2}$ level being at 810 nm. The sharp rise in lasing threshold observed when the pump wavelength was tuned beyond 805 nm could therefore be explained by a reduced pump depopulation of the $^4I_{13/2}$ level, coupled with the strong signal ESA in the green from this level.

As mentioned above, simultaneous lasing at 850 nm and 546 nm was observed under certain conditions, though at present it is not clear exactly what dictates which lasing transition dominates. It was also noted that if the laser had not been operated for a period of time greater than a few hours then the 850 nm transition preferentially lased instead of the green transition, the green lasing threshold having risen significantly (>1 W). However, once lasing had been achieved in the green, the green threshold dropped consistently to a value around 100 mW, whereas the 850 nm lasing was suppressed. This 'memory' of the recent past of the laser was consistently observed though difficult to investigate because of its several hour period.

Spectral analysis of the green laser emission indicated simultaneous lasing on several lines ranging from 543 nm to 548 nm, variations in pump wavelength and power causing changes, as yet to be quantified, in the output spectrum.

The slope efficiency with which 801 nm pump photons are converted into green light is around 11%. This figure is quite remarkable when one considers first the pump excitation mechanism and secondly the background loss in the fibre at both pump and signal wavelengths. In a system with such complicated population dynamics it is difficult to predict the exact effect which these losses will have on the device efficiency and threshold, but a reduction of the 2.9 dB single pass pump loss and the 5.8 dB round-trip loss at the lasing wavelength will result in a substantial increase in overall efficiency.

As described above when pumped at 801 nm the green emission suffers from competition with the 4-level 850 nm lasing transition. The applicants have determined that for lasing to occur on this $^4S_{3/2}$–$^4I_{13/2}$ transition it is necessary to pump ions out of the, long lived, $^4I_{13/2}$ terminal state. In the 801 nm pumped scheme described above, this condition is met through the strong pump ESA out of the $^4I_{13/2}$ level.

Figure 3:
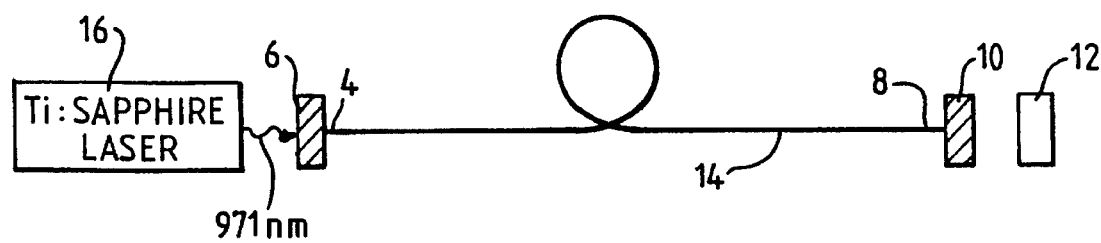

FIG. 3 shows an embodiment similar to the laser of FIG. 2 with common elements assigned the same reference numerals. In this case the laser is pumped by a 971 nm optical pump signal derived from the Ar$^+$ pumped Ti: Sapphire laser 12. In this pumping scheme a population is allowed to build up in the $^4I_{13/2}$ level to reduce the likelihood of lasing at 850 nm. As in the embodiment of FIG. 2 a laser cavity was formed between a highly reflecting mirror 6 and a mirror 10 65% reflecting to green wavelengths. A 3 m fluorozirconate fibre 14 used in FIG. 3 had a $\Delta n$ of 0.014 and a cut-off wavelength of around 790 nm. The fibre background loss at the pump wavelength has been measured as 0.25 dB/m, which for this cavity corresponded to a 0.75 dB loss at the pump wavelength of 971 nm. Initial measurements using this fibre 14 have shown that green lasing can indeed be achieved when pumping at 971 nm, and although 850 nm fluorescence was observed, no competing lasing was noted.

Figure 6:
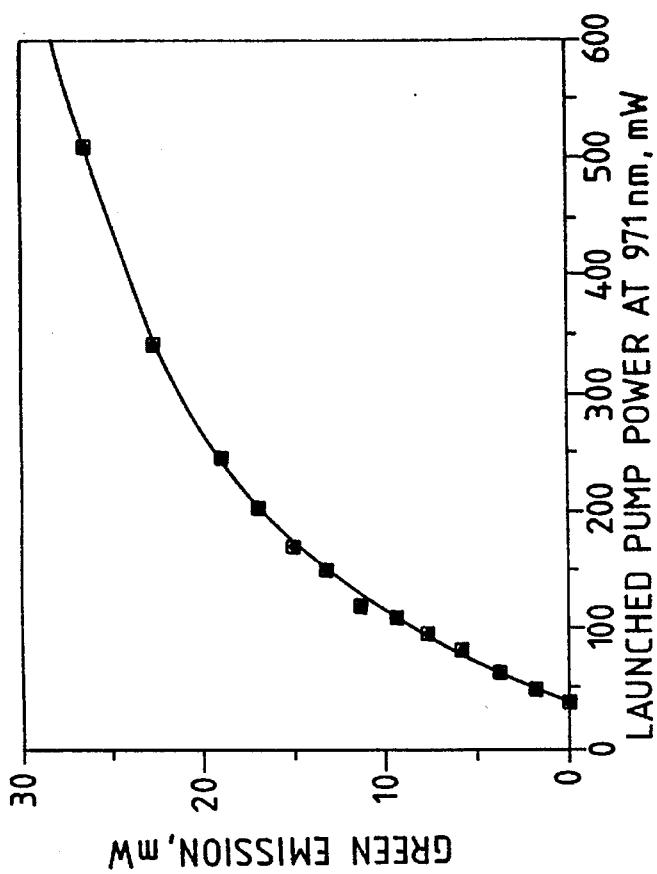
FIGS. 5 and 6 are graphs of the power emitted at a wavelength of 546 nm by the lasers of FIG. 2 and 3 when pumped at 801 nm and 971 nm, respectively, as a function of launched pump power.

FIG. 6 shows the evolution of lasing output power with launched pump power for the laser of FIG. 3. The pump threshold improved to 40 mW absorbed (50 mW launched) and the slope efficiency increased to 15% with respect to launched pump power. The maximum output power observed was 27 mW for a launched pump power of 500 mW.

The present invention provides room temperature lasing at 546 nm on the $^4S_{3/2}$–$^4I_{15/2}$ transition of erbium, in a fluorozirconate glass host when pumped at wavelengths of either 801 nm or 971 nm.

In both pumping schemes lasing output powers in excess of 20 mW have been observed combined with slope efficiencies in excess of 10%. Though further measurements are required to fully assess the relative merits of 801 nm and 971 nm pumping it appears that suppression of the parasitic 850 nm lasing transition can be achieved by pumping at a wavelength of 971 nm.

The potential impact of an efficient and reliable visible laser source is vast. The particular attraction of either of the above schemes is that they employ a single pump laser operating at a wavelength compatible with the present range of commercially available high power FP laser diodes. Erbium doped fluorozirconate fibre lasers may offer efficient means of converting practical semiconductor laser diodes into the much coveted blue/green region of the spectrum.

Figure 7:
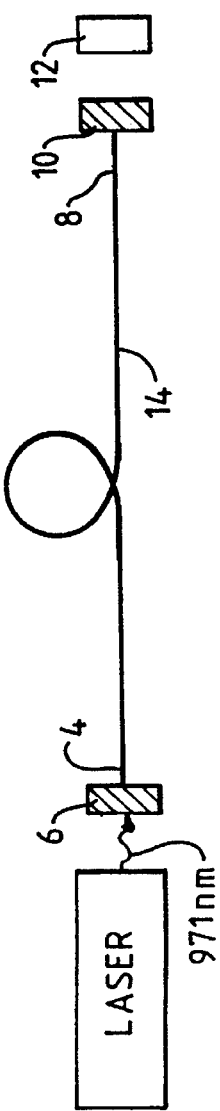
FIG. 7 is a schematic diagram of a further embodiment of a laser according to the present invention.

FIG. 7 shows an embodiment similar to the laser of FIG. 3 with common elements assigned the same reference numerals. In this instance the 971 nm pump signal is obtained from a semiconductor laser (18) which is expected to operate successfully on the basis of the fibre characteristics determined above. Pumping at about 800 nm with a semiconductor source is also expected to be readily achieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of amplifying an optical signal in the green region of the visible spectrum, the method comprising:

optically pumping a fluorozirconate glass optical waveguide doped with erbium ions to promote said erbium ions into the $^4S_{3/2}$ level, without cryogenic cooling, by excited state absorption; and coupling the optical signal to be amplified into said waveguide wherein the waveguide provides optical gain at around 546 nm through stimulated emission from the $^4S_{3/2}$ level.

2. A method of amplifying an optical signal having a wavelength in the green region of the visible spectrum, the method comprising:

optically pumping in the absence of cryogenic cooling a fluorozirconate glass waveguide doped with erbium ions to create a population inversion of erbium ions between the $^4S_{3/2}$ state and the $^4I_{15/2}$ state wherein erbium ions are promoted to the $^4S_{3/2}$ state by excited state absorption; and coupling the optical signal to be amplified into said waveguide wherein the waveguide provides optical gain at around 546 nm through stimulated emission of photons from erbium ions relaxing from the $^4S_{3/2}$ level back to the $^4I_{15/2}$ level.

3. A method of providing laser emission in the green region of the visible spectrum, the method comprising:

optically pumping a laser cavity, the cavity comprising a fluorozirconate glass lasing medium doped with erbium ions and reflectors arranged about the medium to define the cavity, wherein said pumping produces a population inversion of erbium ions between the $^4S_{3/2}$ and $^4I_{15/2}$ energy levels, by excited state absorption in the absence of cryogenic cooling, and wherein stimulated emission at lasing wavelength of about 546 nm is provided.

4. A method as in claim 1 wherein the waveguide is pumped at wavelengths in the range of 791 nm to 812 nm.

5. A method as in claim 4 wherein the waveguide is pumped at a wavelength of about 801 nm.

6. A method as claim 1 wherein the waveguide is pumped at a wavelength of about 971 nm.

7. A method as in claim 2 wherein the waveguide is pumped at wavelengths in the range of 791 nm to 812 nm.

8. A method as in claim 7 wherein the waveguide is pumped at a wavelength of about 801 nm.

9. A method as in claim 2 wherein the waveguide is pumped at a wavelength of about 971 nm.

10. A method as in claim 3 wherein the laser cavity is pumped at wavelengths in the range of 791 nm to 812 nm.

11. A method as in claim 10 wherein the laser cavity is pumped at a wavelength of about 801 nm.

12. A method as in claim 3 wherein the laser cavity is pumped at a wavelength of about 971 nm.

\* \* \* \* \*